United States Patent
Chen et al.

(10) Patent No.: US 10,823,681 B2
(45) Date of Patent: Nov. 3, 2020

(54) SYSTEM AND METHOD FOR IMAGING A SURFACE DEFECT ON AN OBJECT

(71) Applicant: AGENCY FOR SCIENCE, TECHNOLOGY AND RESEARCH, Singapore (SG)

(72) Inventors: Wenyu Chen, Singapore (SG); Wei Xiong, Singapore (SG); Jia Du, Singapore (SG); Jierong Cheng, Singapore (SG); Teck Sun Marcus Wan, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 111 days.

(21) Appl. No.: 16/090,170

(22) PCT Filed: Mar. 30, 2017

(86) PCT No.: PCT/SG2017/050175
§ 371 (c)(1),
(2) Date: Sep. 28, 2018

(87) PCT Pub. No.: WO2017/171651
PCT Pub. Date: Oct. 5, 2017

(65) Prior Publication Data
US 2019/0120770 A1    Apr. 25, 2019

(30) Foreign Application Priority Data
Mar. 30, 2016  (SG) .......................... 10201602496P (51) Int. Cl.
*G01N 21/88* (2006.01)
*G06K 9/32* (2006.01)
(Continued)

(52) U.S. Cl.
CPC ....... *G01N 21/8851* (2013.01); *G01B 11/303* (2013.01); *G06K 9/3233* (2013.01);
(Continued)

(58) Field of Classification Search
CPC ....... G01N 21/8851; G01N 2021/8867; G06K 9/3233; G06K 9/3241; G06T 7/001;
(Continued)

(56) References Cited

U.S. PATENT DOCUMENTS

| 5,517,027 A * | 5/1996 | Nakagawa | ............. | B82Y 35/00 250/307 |
| 2003/0151008 A1* | 8/2003 | Yamada | ............. | G01N 21/8901 250/559.45 |

(Continued)

OTHER PUBLICATIONS

PCT Notification of Transmittal of the "International Search Report" for PCT Counterpart Application No. PCT/SG2017/050175; dated Jun. 19, 2017; 3 pp.
(Continued)

*Primary Examiner* — Juan A Torres
(74) *Attorney, Agent, or Firm* — Womble Bond Dickinson (US) LLP (57) ABSTRACT

A system and a method for imaging a surface defect on an object are provided. The system includes an actuator, a sensor assembly connected to the actuator, and a processor configured to control the actuator and the sensor assembly. The sensor assembly includes at least one sensor configured to capture at least one image of the object. The processor is configured to control the actuator and the sensor assembly to identify the actuator and the sensor assembly, a region of a region of interest associated with the surface defect using an using an image of the object and to repeatedly identify at least one subsequent region of interest associated with the surface defect using at least a preceding region of interest
(Continued)

such that the surface defect is identified according to a predetermined criterion.

15 Claims, 9 Drawing Sheets

(51) Int. Cl.
  *G06T 7/00* (2017.01)
  *G01B 11/30* (2006.01)
  *G06T 7/40* (2017.01)
(52) U.S. Cl.
  CPC ............ *G06K 9/3241* (2013.01); *G06T 7/001* (2013.01); *G06T 7/0004* (2013.01); *G06T 7/40* (2013.01); *G01N 2021/8867* (2013.01); *G06T 2207/10028* (2013.01); *G06T 2207/20016* (2013.01); *G06T 2207/30108* (2013.01)
(58) Field of Classification Search
  CPC ................... G06T 7/0004; G06T 7/40; G06T 2207/30108; G06T 2207/10028; G06T 2207/20016; G01B 11/303
  USPC ......................................................... 382/108
  See application file for complete search history.

(56) References Cited

U.S. PATENT DOCUMENTS

| | | | | |
|---|---|---|---|---|
| 2007/0064224 | A1* | 3/2007 | Kreh | G01N 21/9501 356/237.2 |
| 2008/0247635 | A1* | 10/2008 | Davis | G06T 19/00 382/152 |
| 2010/0177191 | A1* | 7/2010 | Stier | G01N 21/8806 348/92 |
| 2011/0090333 | A1* | 4/2011 | Haugan | G01N 21/8806 348/136 |
| 2011/0103679 | A1* | 5/2011 | Campbell | G01B 11/0608 382/152 |
| 2017/0270651 | A1* | 9/2017 | Bailey | G01N 21/8806 |
| 2018/0130197 | A1* | 5/2018 | Weiss | H04N 5/2256 |

OTHER PUBLICATIONS

PCT Notification of Transmittal of the "Written Opinion" for PCT Counterpart Application No. PCT/SG2017/050175; date completed Jun. 14, 2017; 5 pp.

PCT Notification of Transmittal of the "International Preliminary Report on Patentability" for PCT Counterpart Application No. PCT/SG2017/050175; date of completion Jun. 14, 2017; 6 pp.

* cited by examiner

Prior Art

SYSTEM AND METHOD FOR IMAGING A SURFACE DEFECT ON AN OBJECT

CROSS-REFERENCE TO RELATED APPLICATIONS

This patent application is a U.S. National Phase Application under 35 U.S.C. § 371 of International Application No. PCT/SG2017/050175, filed on 30 Mar. 2017, entitled SYSTEM AND METHOD FOR IMAGING A SURFACE DEFECT ON AN OBJECT, which claims the benefit of priority from Singapore Patent Application No. 10201602496P, filed on 30 Mar. 2016, the content of which was incorporated herein by reference in the entirety for all purposes.

PRIORITY CLAIM

This application claims the benefit of priority from Singapore Patent Application No. 10201602496P filed on 30 Mar. 2016, the content of which is incorporated herein by reference in its entirety for all purposes.

TECHNICAL FIELD

The present invention generally relates to a system and a method for imaging a surface defect on an object. More particularly, it relates to a system and a method for defining viewpoints and sensing parameters to capture both geometry dimensional and surface appearance defects on an object.

BACKGROUND ART

Visual inspection of surfaces for defects can involve dimension inspection and surface inspection. Dimension inspection is based on geometric shapes and typically captured using a positioning device holding a geometry sensor (a depth sensor, or a 3D scanner and etc.), while surface inspection is based on images. Sensor planning, i.e. identification of sensor locations to capture different parts of the object with required specifications is important for acquiring the desired geometric shapes for dimensional inspection. On the other hand, surface inspection relies on the imaging quality of the camera. Different views of a target region may need to be acquired for analysis to identify the existence of a defect.

Dimensional inspection is generally achieved by comparing the scanned model of the inspection target with the computer aided design (CAD) model to detect dimensional defects such as bending, missing material etc. The scanned model is usually acquired using a robot with a geometry sensor. To derive a complete scanned model with high accuracy, active sensor planning is traditionally adopted to plan a set of viewpoints and sensing parameters per inspection taskers. In other words, the set of viewpoints are predetermined. A constraint satisfaction approach is used to obtain the viewpoints satisfying task requirements such as resolution, focus, field of vision (FOV), visibility, view angle, image contrast and prohibited regions. A machine vision planner (MVP) system can then synthesize viewpoints based on sensor models, object models, illuminator models and task specifications. The specification-driven viewpoint planning is based on the task and system specifications including the scanning objective (precision, density, coverage), performance measures (planning quality and efficiency), and imaging environment (range sensor and positioning system).

Surface inspection is conducted with textures using image processing and analysis. Surface inspection can be used to identify defects on surfaces of various materials, such as bearing covers (deformations, rusts, scratches, cracks, etc.), fabric defects (slub, missing yarn, oil stain, chapped pick, dyed yarn, broken pick, etc.), defects in semiconductors (pinhole, scratch, erosion, ripple, etc.), defects on metallic, plastic or wooden surfaces (pitting, crack, scratch, corrosion, seam, etc.), mura defects on liquid crystal display (LCD) (black spot, white spot, line mura, blob mura, etc.), cracks on ceramic and tiles (pinhole, ellipse glaze, scratch, crack, blob, edge), concrete cracks.

Dimensional inspection and surface inspection are usually performed separately with two different inspection systems, as surface inspection systems focus on capturing local defects based on images while dimensional inspection systems target to acquire the overall geometry. While some inspection systems can capture both 3D geometry and 2D images to enable the dimensional inspection and surface inspection, the viewpoints for all these systems are predefined before the sensing, e.g. with active sensor planning. For example, in surface inspection of objects of the same type, manual selection is required to define viewpoints for image capturing, while in dimensional inspection systems, CAD-based active sensing is adopted to derive the viewpoints for capturing the 3D geometry. Multi-view based inspection systems may acquire inspection data by combining both shapes and images from different viewpoints.

Figure 1A:
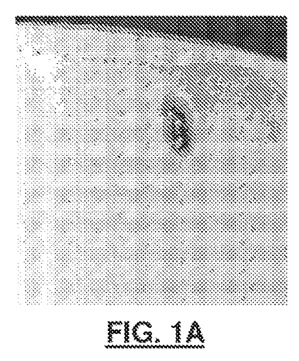
FIGS. 1A-1C show various surface defects on an object.
Figure 1B:
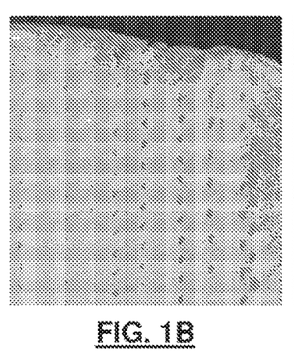
Figure 1C:
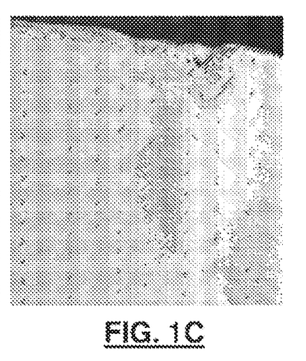
Figure 1D:
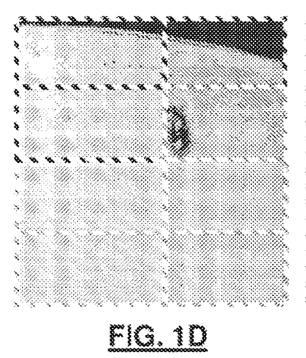
FIGS. 1D-1F show the region of interest (ROI) for capturing surface defects of FIG. 1A-1C planned using conventional methods.
Figure 1E:
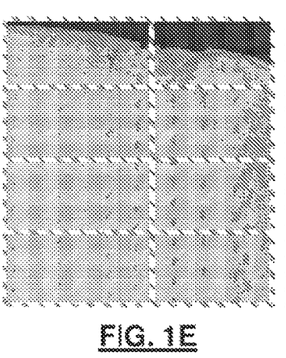
Figure 1F:
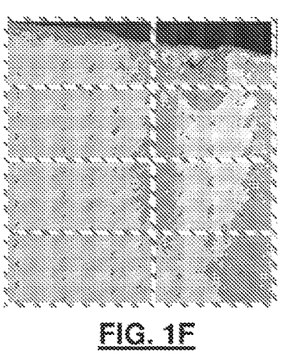

While surface defects may be visible with adjustments in view angles, illumination conditions, resolutions and focusing, the viewpoints are predetermined and the imaging system can only capture a small region on an object. The system is also restricted by limited field of view at each viewpoint. Specifically, such existing systems use a same set of viewpoints for objects of the same type (see FIGS. 1D-1F). However, some surface defects, such as cracks, erosions, and corrosions, may appear in any region on the surface of the object (FIGS. 1A-1C). Particularly, the locations of such defects are unknown to the system before sensing. Thus, the defect regions may not be captured with the desired quality.

Accordingly, what is needed is a system and a method for imaging a surface defect on an object that seeks to address some of the above problems. Furthermore, other desirable features and characteristics will become apparent from the subsequent detailed description and the appended claims, taken in conjunction with the accompanying drawings and this background of the disclosure.

SUMMARY OF INVENTION

A first aspect of the present invention provides a system for imaging a surface defect on an object, the system comprising, an actuator, a sensor assembly connected to the actuator, the sensor assembly comprising at least one sensor configured to capture at least one image of the object; and a processor configured to control the actuator and the sensor assembly to identify a region of interest associated with the surface defect using an image of the object and repeatedly identify at least one subsequent region of interest associated with the surface defect using at least a preceding region of interest such that the surface defect is identified according to a predetermined criterion.

The at least one sensor may comprise a geometry sensor configured to capture two-and-a-half-dimensional and/or three-dimensional images of the object. The processor may be configured to determine, using the two-and-a-half-dimensional and/or the three-dimensional images of the object, geometrical properties of the object.

The processor may identify the region of interest and the at least one subsequent region of interest based on the geometrical properties of the object.

The at least one sensor may comprise a texture sensor configured to capture two-dimensional images of the object. The processor may be configured to determine, using the two-dimensional images of the object, texture properties of the object.

The processor may identify the region of interest and the at least one subsequent region of interest based on the texture properties of the object.

The predetermined criterion may be a predetermined number of pixels per unit length.

The predetermined number of pixels per unit length may be at least 5 pixels per millimeter.

The at least one sensor may capture the at least one image of the object in a first resolution and may capture the least one subsequent region of interest associated with the surface defect in a second resolution, wherein the second resolution is higher than the first resolution.

A second aspect of the present invention provides a method of imaging a surface defect on an object, the method comprising capturing, using a sensor assembly connected to an actuator, at least one image of the object identifying, using a processor configured to control the actuator and the sensor assembly, a region of interest associated with the surface defect using an image of the object, and repeatedly identifying at least one subsequent region of interest associated with the surface defect using at least a preceding region of interest such that the surface defect is identified according to a predetermined criterion.

The step of capturing the at least one image of the object may comprise capturing two-and-a-half-dimensional and/or three-dimensional images of the object using a geometry sensor, and the step of identifying the region of interest and the at least one subsequent region of interest may comprise determining, using the two-and-a-half-dimensional and/or the three-dimensional images of the object, geometrical properties of the object.

The step of identifying the region of interest and the at least one subsequent region of interest may comprise identifying the region of interest and the at least one subsequent region of interest using the geometrical properties of the object The step of capturing the at least one image of the object may comprise capturing two-dimensional images of the object using a texture sensor, and the step of identifying the region of interest and the at least one subsequent region of interest may comprise determining, using the two-dimensional images of the object, textures properties of the object.

The step of identifying the region of interest and the at least one subsequent region of interest may comprise identifying the region of interest and the at least one subsequent region of interest using the texture properties of the object.

The predetermined criterion may be a predetermined number of pixels per unit length.

The predetermined number of pixels per unit length may be at least 5 pixels per millimeter.

The step of capturing the at least one image of the object using the at least one sensor may comprise capturing the at least one image of the object in a first resolution and capturing the least one subsequent region of interest associated with the surface defect in a second resolution, wherein the second resolution is higher than the first resolution.

A third aspect of the present invention provides a non-transitory computer readable medium having stored thereon an application which when executed by a computer causes the computer to perform steps comprising, capturing, using a sensor assembly connected to the actuator, at least one image of the object, identifying, using a processor configured to control the actuator and the sensor assembly, a region of interest associated with the surface defect using an image of the object, and repeatedly identifying at least one subsequent region of interest associated with the surface defect using at least a preceding region of interest such that the surface defect is identified according to a predetermined criterion.

BRIEF DESCRIPTION OF DRAWINGS

Embodiments of the invention will be better understood and readily apparent to one of ordinary skill in the art from the following written description, by way of example only, and in conjunction with the drawings, in which.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DESCRIPTION OF EMBODIMENTS

The following detailed description is merely exemplary in nature and is not intended to limit the invention or the application and uses of the invention. Furthermore, there is no intention to be bound by any theory presented in the preceding background of the invention or the following detailed description.

Herein, a system 300 (FIG. 3) and a method 400 (FIG. 4) for imaging a surface defect on an object are presented in accordance with present embodiments having the advantages of optimal data acquisition and better inspection results. In exemplary embodiments, the system 300 and the method 400 can define viewpoints and sensing sensor parameters to capture both dimensional and surface defects on the object.

Figure 3:
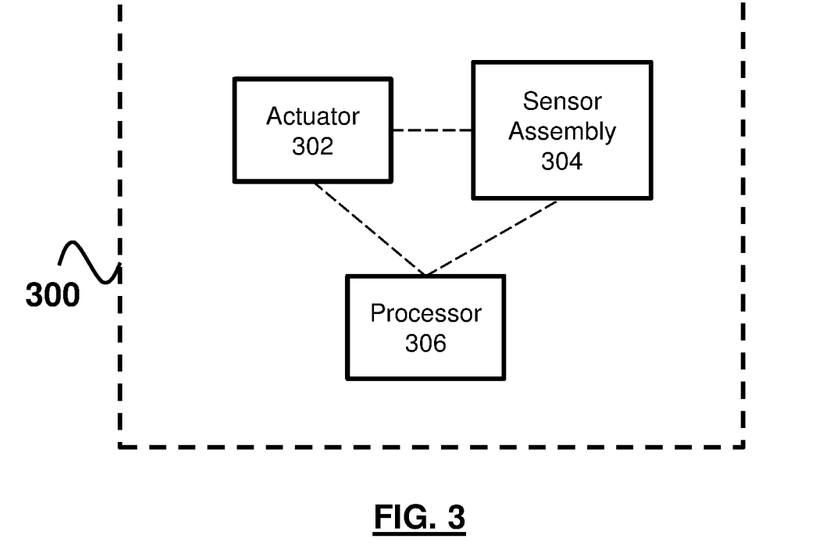
FIG. 3 shows a schematic diagram of a system for imaging a surface defect on an object in accordance with embodiments of the present invention. In an exemplary embodiment, the system can define ROIs to capture both dimensional and surface appearance defects on an object.

In an exemplary embodiment, as shown in FIG. 3, the system 300 comprises an actuator 302, a sensor assembly 304 connected to the actuator 302, the sensor assembly 304 comprising at least one sensor configured to capture at least one image of the object, and a processor 306 configured to control the actuator 302 and the sensor assembly 304 to identify a region of interest associated with the surface defect using an image of the object, and repeatedly identify at least one subsequent region of interest associated with the surface defect using at least a preceding region of interest such that the surface defect is identified according to a predetermined criterion. As will be described in more detail later, a region of interest (ROI) can refer to a region 510 on image 500 of object 508 where defects exist (see FIG. 5A). In embodiments, the sensor assembly 300 can comprise at least one sensor configured to capture at least one texture image of the object and at least one geometry sensor configured to capture at least one depth image (or one three-dimensional image of the object. The processor 306 can then control the actuator 302 and the sensor assembly 304 to identify a region of interest and a viewpoint associated with the surface defect using a texture image and a depth/three-dimensional image of the object, and repeatedly identify at least one subsequent region of interest associated with the surface defect using at least a preceding region of interest such that the surface defect is identified according to a predetermined criterion. The at least one geometry sensor may include one or more depth sensors and/or one or more 3D scanners configured to provide two and a half-dimensional (2.5D) and/or three-dimensional (3D) geometry information. For example, a depth sensor can capture a two-dimensional depth image from which 2.5D geometry information can be derived. A 3D scanner can capture a three-dimensional depth image from which 3D geometry information can be derived.

Figure 4:
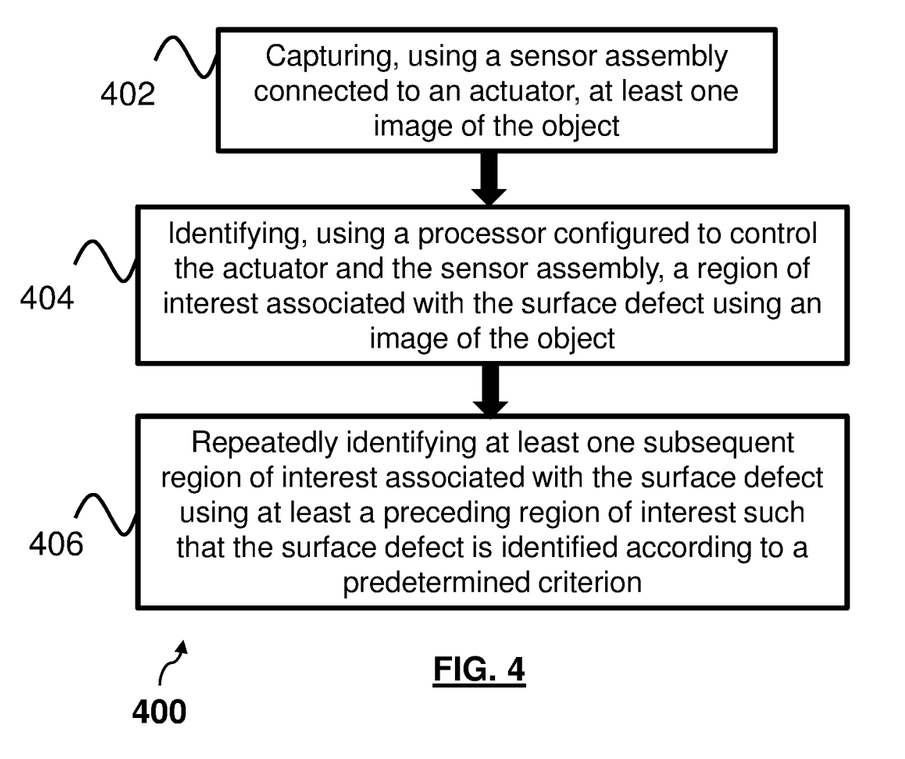
FIG. 4 shows a flowchart illustrating a method for imaging a surface defect on an object in accordance with embodiments of the present invention. In an exemplary embodiment, the method can include defining ROIs to capture both dimensional and surface defects on an object.

Further, as shown in FIG. 4, a method 400 of imaging a surface defect on an object, in accordance with embodiments, comprises (i) step 402 of capturing, using a sensor assembly connected to an actuator, at least one image of the object, (ii) step 404 of identifying, using a processor configured to control the actuator and the sensor assembly, a region of interest associated with the surface defect using an image of the object, and (iii) step 406 of repeatedly identifying at least one subsequent region of interest associated with the surface defect using at least a preceding region of interest such that the surface defect is identified according to a predetermined criterion. In embodiments, the step 402 can comprise, using the sensor assembly connected to the actuator, to capture at least one texture image and one depth/three-dimensional image of the object. The method 400 can then define ROIs to image both dimensional and surface appearance defects present.

Figures 2A, 2B:
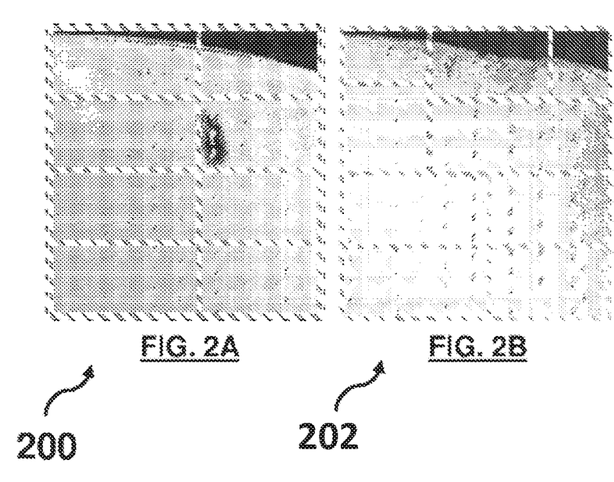
FIGS. 2A-2C show ROIs for capturing the surface defects of FIG. 1A-1C identified using adaptive viewpoints in accordance with embodiments of the present invention.
Figure 2C:
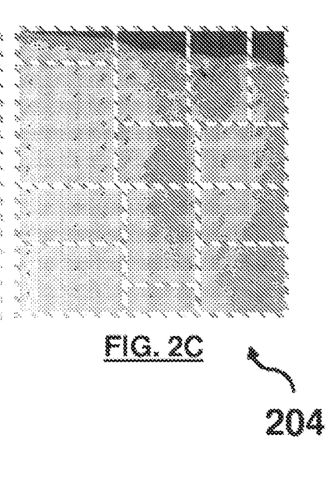

The system 300 and the method 400 have the advantages of optimal data acquisition and better inspection results. To achieve optimal data acquisition, online planning (e.g. the repeated identification of at least one subsequent region of interest associated with the surface defect using at least a preceding region of interest) is implemented in embodiments of the invention to find adaptive viewpoints for each object (see FIG. 2A-2C). Specifically, regions associated with defects on an inspection target (also referred herein as an object) can be captured using various adaptive viewpoints 200, 202, 204. To achieve better inspection result, a defect region is captured with optimal angles, illumination, etc., or imaged in multi-view. The present embodiments may also include a robotic sensing framework for visual inspection having the following features:

Adaptive viewpoints: Viewpoints are identified based on individual object adaptive to different defect locations (FIG. 2A-2C).

Adaptive sensor parameters: Sensor parameters at each viewpoint are adapted to the surface conditions for optimized geometry and/or image quality.

Adaptive data fusion: Data from all viewpoints are fused together to provide an adaptive model.

Figure 5A:
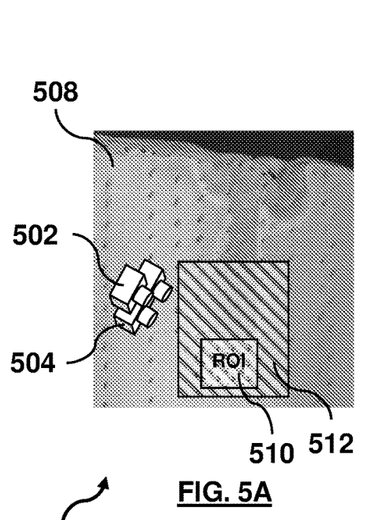
FIGS. 5A-5C show a flow diagram illustrating the defining of the ROIs and sensing viewpoints to capture a surface detect shown in FIG. 1C, using the method of FIG. 4.
Figure 5B:
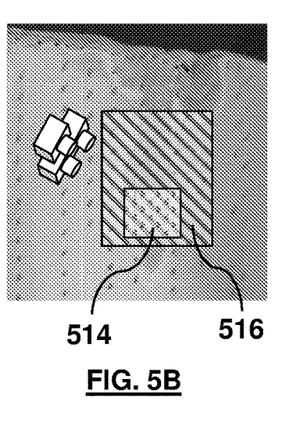
Figure 5C:
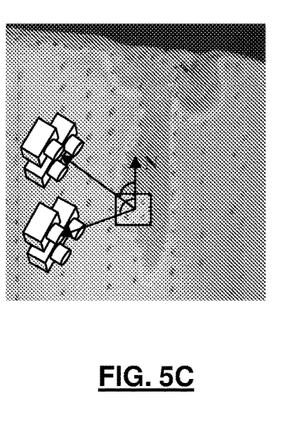

Embodiments of the present invention, with reference to FIGS. 5A to 5C also support both the geometry and the surface inspection tasks using an online adaptive sensing and inspection solution as described in the system 300 and the method 400. The online adaptive sensing and inspection solution comprises the following hardware:

A geometry sensor 504 to capture the local fine geometry of an object 508.

A texture sensor 502 to collect 2D images of the object 508 to be inspected.

A robotic arm (see FIG. 14, robotic arm 1404) to move the texture and geometry sensors 502, 504.

In other words, the system for imaging a surface defect on an object comprises at least one sensor having a geometry sensor 504 (also known herein as the geometry sensor 504) configured to capture two-and-a-half-dimensional and/or three-dimensional images of the object, and wherein the processor (not shown) is configured to determine, using the two-and-a-half-dimensional and/or the three-dimensional images of the object, geometrical properties of the object. The at least one sensor also comprises a texture sensor 502 configured to capture two-dimensional images of the object 508, and wherein the processor (not shown) is configured to determine, using the two-dimensional images of the object, texture properties of the object 508.

Embodiments may also include a global-view sensor (see FIG. 14, sensor 1410 for example) to capture the overall coarse geometry of the inspection target. In alternate embodiments, it can be appreciated that the geometry sensor 504 may also be used to capture the overall coarse geometry of the inspection target.

As mentioned above, a region of interest (ROI) refers to a region 510 on the object 508 where defects may exist (FIG. 5A). In the system (not shown), the texture sensor 502 and the geometry sensor 504 are mounted together and pre-calibrated (FIG. 5A). The field of view (FOV) of the texture sensor 502 covers the FOV of the geometry sensor 504 (FIGS. 5A and 5B). As such, after sensing a local region 512 (FIG. 5A), a new ROI 514 is identified for planning next sensing viewpoint 516 (FIG. 5B). A region on the surface may be sensed at different viewpoints with different sensing angles (FIG. 5C). In other words, as discussed above, the step of capturing the at least one image of the object comprises capturing two-and-a-half-dimensional and/or three-dimensional images of the object using a geometry sensor, and the step of identifying the region of interest and the at least one subsequent region of interest comprises determining, using the two-and-a-half-dimensional and/or the three-dimensional images of the object, geometrical properties of the object. The step of capturing the at least one image of the object may also comprise capturing two-dimensional images of the object using a texture sensor and the step of identifying the region of interest and the at least one subsequent region of interest comprises determining, using the two-dimensional images of the object, textures properties of the object. Further, it can be appreciated that the step of identifying the region of interest and the at least one subsequent region of interest comprises identifying the region of interest and the at least one subsequent region of interest using the geometrical properties and the texture properties of the object.

For better inspection result, the geometry and texture quality should meet the following criteria (also known as predetermined criterion in the aforementioned paragraphs):

The sampling density of geometry sensor 504 within ROI 510, 514 should be larger than a threshold $\Phi_1$.

The sampling density of geometry sensor 504 within non-ROI regions should be larger than a threshold $\Phi_2$.

The geometry sensor 504 capture each point with accuracy larger than a threshold $\Phi_3$.

The texture sensor 502 captures each point with angle smaller than a threshold $\Theta_1$ The texture sensor 502 capture images with pixel size smaller than a threshold $\Theta_2$.

The geometry sensor 504 would sense the object 508 with certain density $\Phi_2$ and accuracy $\Phi_3$ to enable the dimensional inspection. To support accuracy 3D measurement in the ROIs, different densities $\Phi_1$ for ROIs 510, 514 and $\Phi_2$ for non-ROIs with $\Phi_1 > \Phi_2$ are adopted, which can be beneficial in the following ways:

Sensing efficiency is improved by avoiding using high density for the whole object 508 $\Phi_2 = \Phi_1$. In other words, high density imaging is used only for regions of interest.

3D measurement accuracy in ROIs 510, 514 is higher than that in non-ROIs. As such, measurement of defect in images can be achieved.

Surface inspection requires the images for inspection to be captured with a proper angle. Thus, a value for $\Theta_1$ should be selected. If all defects to be detected are visible on any view angle by texture sensor 502, the threshold can be set as $\Theta_1 \approx 0$. Otherwise, if there is a defect that can only be visible on perpendicular view angle, the threshold needs to be set as $\Theta_1 \approx 90$.

Figure 6A:
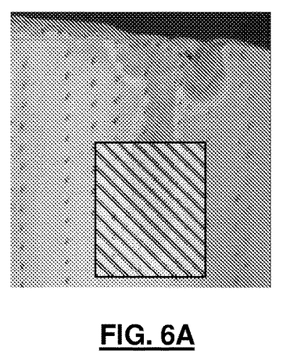
FIGS. 6A and 6B show the method of FIG. 4 using different region of interest (ROI) sizes.
Figure 6B:
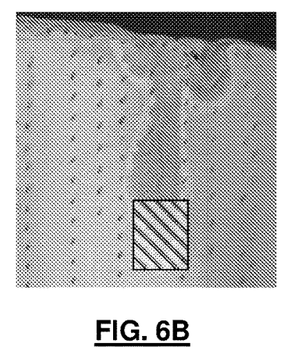

Surface inspection is performed based on the images from the texture sensor 502. The sensing parameter, the pixel size $\Theta_2$, is chosen to detect defect of size $5\Theta_2$. As an example, to detect a defect of size 1 mm, the defect should be covered by at least five pixels. As such, the size of each pixel should be smaller than 0.2 mm. In other words, one of the predetermined criteria is a predetermined number of pixels per unit length. The predetermined number of pixels per unit length may be at least 5 pixels per millimeter. Since the resolution of the images from the texture sensor is fixed as r×c, the area of each ROI becomes $r\Theta_2 \times c\Theta_2$. Therefore, the smaller the defect to be detected, the smaller the ROI regions that may be used. FIGS. 6A and 6B shows different ROI sizes according to different criterion mentioned above (i.e. number of pixels per unit length). In FIG. 6B, the ROI size is smaller than that of ROI size in FIG. 6A as the criterion is more stringent, i.e. predetermined number of pixels per unit length in FIG. 6B is twice that of FIG. 6A.

Sensing and Inspection Solution

Figure 7:
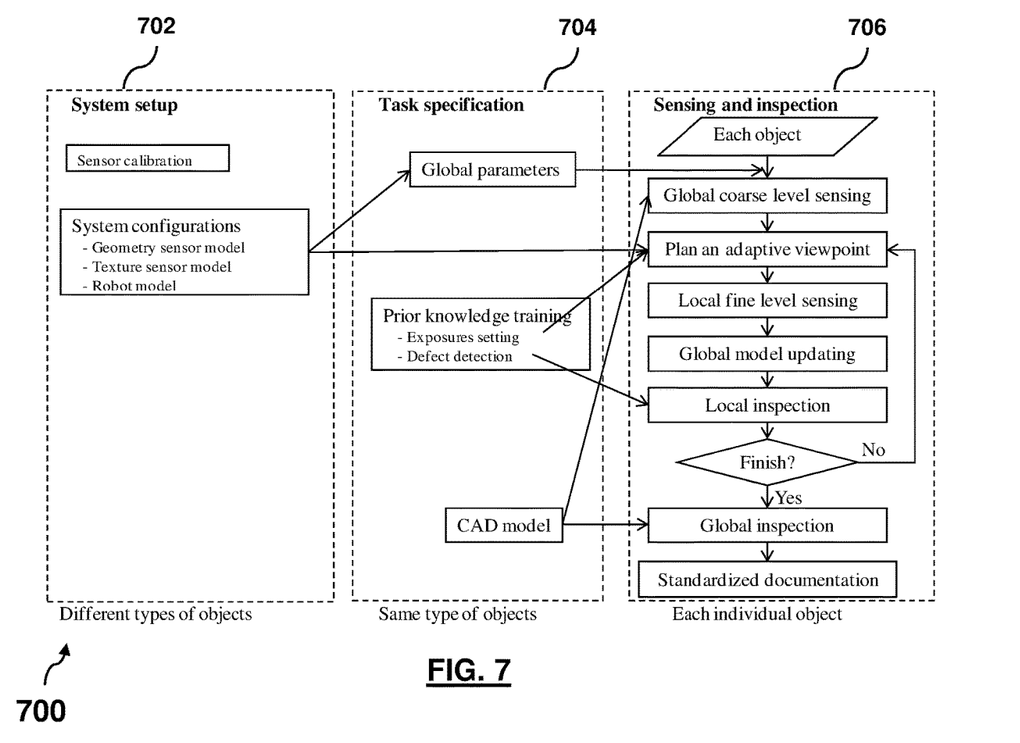
FIG. 7 shows a flowchart illustrating a method for defining viewpoints and sensing parameters to capture both dimensional and surface defects on an object in accordance with embodiments of the present invention.

FIG. 7 shows the flowchart 700 of the proposed solution for the visual inspection, which contains three parts: system setup 702 for different types of objects, task specification 704 for objects of the same type, and online inspection 706 for each object. The system setup 702 consists of the following two parts:

Sensor calibration: calibrate different sensors (long range sensor, texture sensor, geometry sensor) into a same coordinate system, i.e. the robotic base coordinate system. It can be appreciated in alternate embodiments, that the geometry sensor and the long range sensor can be the same sensor calibrated for use at different circumstances.

System configuration: configure device specifications, which will be considered in viewpoint calculation. Specifications includes:

Geometry sensor: field of view, clear distance, depth of field, precision for each measurement point, point density at different sensing distance.

Texture sensor: field of view, depth of field

Robot: position accuracy.

The task specification 704 seeks to specify the global parameters for objects of the same type, which includes:

Collect and train prior knowledge: Given a new image, the system can detect the defects as regions of interest (ROIs). Given a ROI, the system can decide the sensing exposure for the geometry sensor to sense this ROI.

Set global sensing parameters, $\Phi_i$ and $\Theta_j$, for the desired geometry and texture quality.

Prepare the same CAD model for the objects to be inspected.

The online inspection 706 performs sensing and inspection on each object. It includes these steps a. Global coarse level sensing: the long-range sensor is used to acquire a coarse level model of the inspection target. The coarse mesh acts as the big picture to guide the online planning of the viewpoints. If necessary, the CAD model can be used to replace the coarse level model by alignment and registration.

b. Plan an adaptive viewpoint: One viewpoint is planned to capture data from one ROI, which is defined adaptive to the defect feature. The first viewpoint is initialized after identifying an initial ROI on the global model.

After that, new ROIs are derived from the local inspection. Each ROI is used to plan one viewpoint and sensing parameters.

c. Local fine level sensing: Each non-ROI region is sensed with a lower point density $\Phi_2$. Each ROI is sensed with higher point density $\Phi_1$ to increase the 3D resolution in this region.

d. Global model updating: Fine level textured geometry from the sensors is used to update the global model. Due to the using of different point densities, the global model is represented in a multi-resolution way.

e. Local inspection: Defect detection algorithm is performed on each texture image to identify the possible defects. Each defect region acts as an ROI, which is then mapped to the global model. Joint texture and geometry analysis is performed to divide the ROI into different ROI for the geometry and texture cameras.

f. Check termination conditions: Each point on the global model should be scanned with the desired high geometry quality and texture quality.

g. Global inspection: Global defects like dimensional distortion and missing material are inspected automatically in a global scale by comparing with the CAD model.

h. Standardized reporting: The summary of defects, such as location, size, and appearance If sensors and the robot (the actuator) are fixed for inspecting different types of defects on different objects, system configuration remains unchanged, and they only need to be calibrated once. For inspecting objects of a same type, the task specification can be performed once. If new training data is available, prior knowledge training can be updated to include the new training data.

As presented above, various inspection methods, in accordance with embodiments of the present invention can be used to detect defects given the desired high quality geometry and texture data. All surface defect detection methods can be deployed into the solution during prior knowledge training for local inspection, and all dimensional inspection methods can be used for global inspection.

Figure 8:
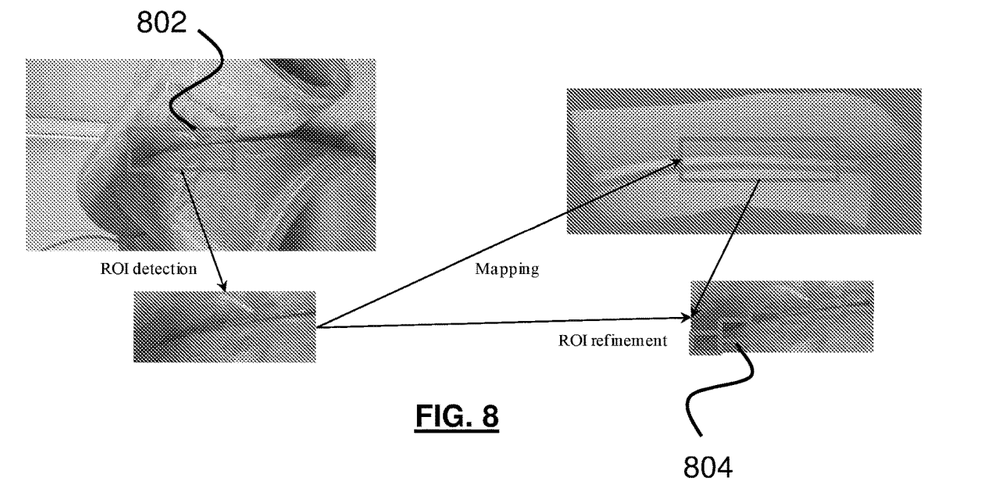
FIG. 8 shows a flow diagram illustrating a method for defining viewpoints and sensing parameters to capture both dimensional and surface defects on an object on a pipe joint, in accordance with embodiments of the present invention.

FIG. 8 shows a flow diagram illustrating a method of imaging a surface defect on a pipe joint, in accordance with embodiments of the present invention. FIG. 8 shows a pipe joint inspected using the method of imaging a surface defect. An ROI is a region on the object (pipe joint) where the defects may be detected. An ROI region 802 is detected using the training module. Since the size of the surface should be smaller than $r\Theta_2 \times c\Theta_2$, the detected ROI may need to be refined into smaller ones 804. In FIG. 8, the initial ROI 802, i.e. the Y-joint region between two pipes, is detected based on the texture image and mapped to the 3D geometry. The ROI refinement is performed by considering both the texture and geometry information. A viewpoint will be planned for each refined ROI 804 for high quality image and geometry capturing.

Figures 9A, 9B:
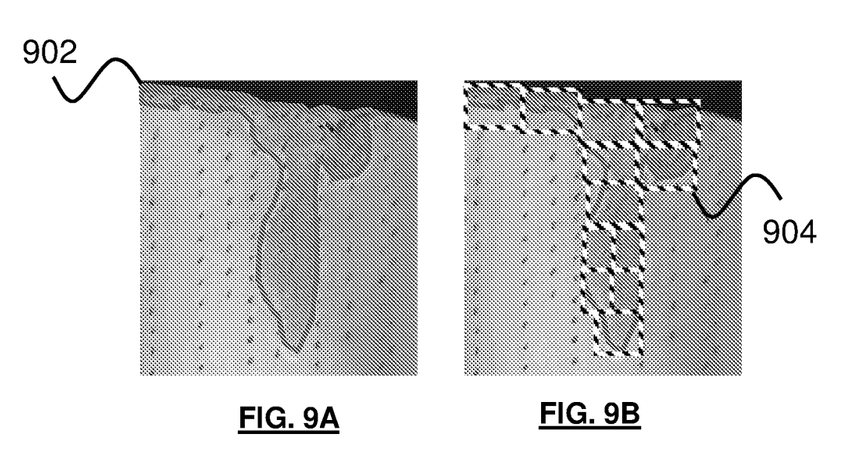
FIGS. 9A and 9B show the ROIs for capturing the surface defect of FIG. 1C identified using adaptive viewpoints in accordance with embodiments of the present invention.

FIGS. 9 and 10 show identification and refinement of a surface defect on an object e.g. corrosion. Generally, the method comprises identifying a first region of interest (ROI) associated with the surface defect using an image of the object. At least one subsequent region of interest (ROI) associated with the surface defect is then repeatedly identified using at least a preceding region of interest, such that the surface defect is identified according to a predetermined criterion. FIGS. 9A, 9B and FIGS. 10A to 10F show an exemplary method of identifying the surface defect of FIG. 1C using adaptive viewpoints as described herein. Specifically, FIG. 9A shows ROI detection (an example of identi- fication of a region of interest associated with the surface defect using an image of the object) while FIG. 9B shows an example of ROI refinement (a result of repeated identification of at least one subsequent region of interest (ROI) associated with the surface defect, using at least a preceding region of interest, such that the surface defect is identified according to a predetermined criterion). While FIGS. FIGS. 9A and 9B show that the initial ROI 902 comprises the entire surface defect captured in the image and that subsequent ROIs 904 overlap the initial ROI 902, it can be appreciated that the initial ROI 902 may be only a subset of the ROIs 904, that additional regions of interest can be identified during ROI refinement.

Figure 10A:
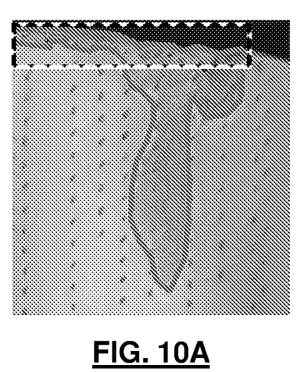
FIGS. 10A-10F show a detailed sequence of identifying ROIs illustrated in FIG. 9B for the surface defect of FIG. 1c, in accordance with embodiments of the present invention.
Figure 10B:
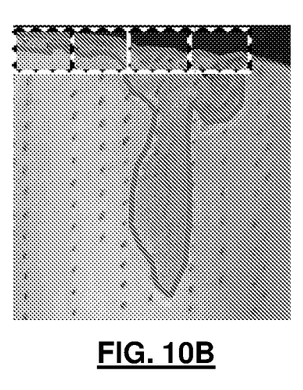
Figure 10C:
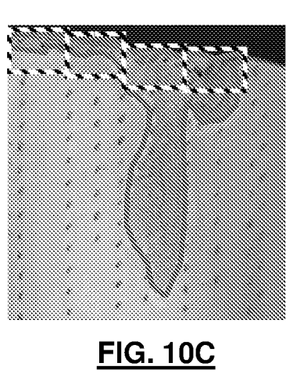
Figure 10D:
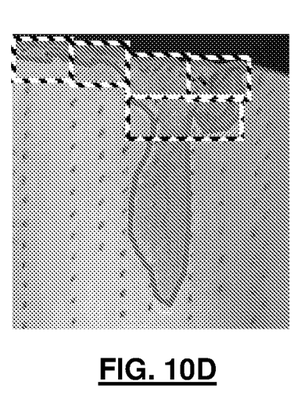
Figure 10E:
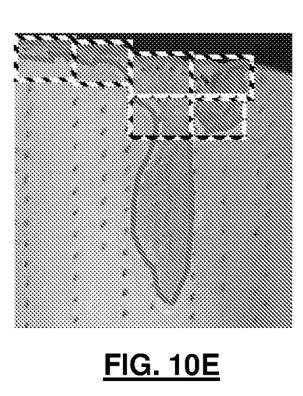
Figure 10F:
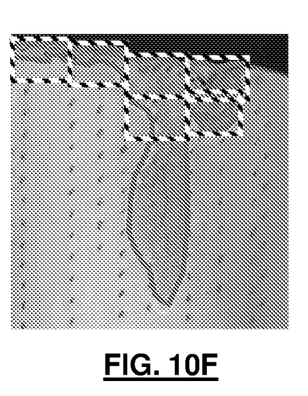

FIGS. 10A to 10F show the intermediate steps of ROI refinement. With reference to FIG. 9A, if detected ROI 902 is large, such that the predetermined criteria is not satisfied (FIG. 9A), the detected ROI 902 will be refined into several smaller ROIs 904 (FIG. 9B). Remnant $\Omega$ is first initialized as the original ROI $\Omega=R$ (FIG. 9A). The ROI refinement algorithm will iteratively reduce the size of $\Omega$ to zero. Each iteration consists of three steps:

1. Horizontal segmentation: a horizontal segment is derived which starts from the first pixel on the first row of R with height $r\Theta_2$ (FIG. 10A and FIG. 10D).
2. Coarse refinement: each horizontal segment is refined into several smaller ROIs with width smaller than $c\Theta_2$ (FIG. 10B and FIG. 10E).
3. Fine adjustment: each refined ROI is offset to fit the remnant $\Omega$ while keeping its size smaller than $r\Theta_2 \times c\Theta_2$ (FIG. 10C and FIG. 10F).

In such a way, the i-th iteration will produce several $R_{i,j}$, and the remnant $\Omega$ is updated as $$\Omega = \Omega - \bigcup_j R_{i,j}$$

The size of the remnant is reduced after each iteration, and the refinement algorithm terminates until $\Omega=\emptyset$. As such, the original ROI in FIG. 9A is replaced by a set of refined ROIs in FIG. 9B.

$$R \subseteq \bigcup_{i,j} R_{i,j}$$

Figure 11:
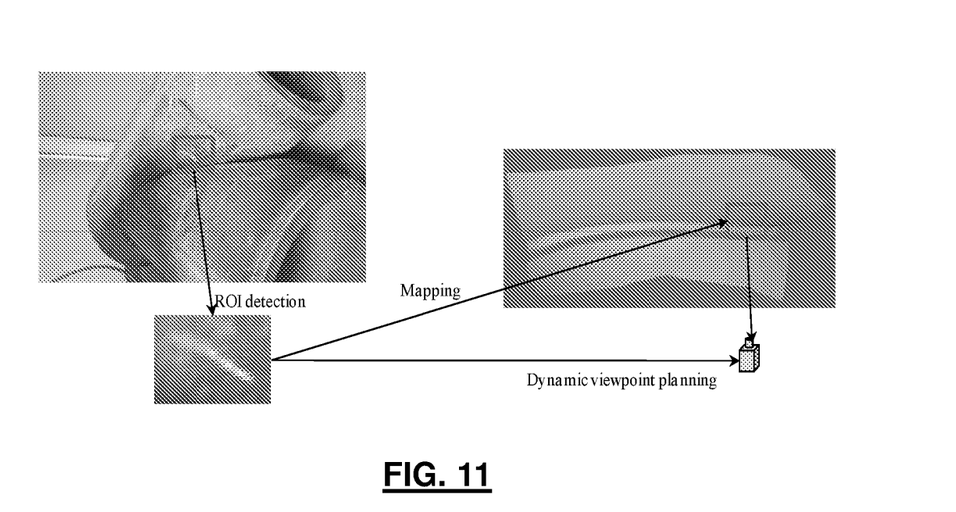
FIG. 11 shows a joint texture and geometry analysis for a subsequent viewpoint, in accordance with embodiments of the present invention.

FIG. 11 shows joint texture and geometry analysis for a subsequent viewpoint. One viewpoint with adaptive sensing parameters is planned for each ROI for high quality sensing. The viewpoint is planned such that the geometry sensor and image sensor will capture the high-quality data per the aforementioned requirement.

Figure 12:
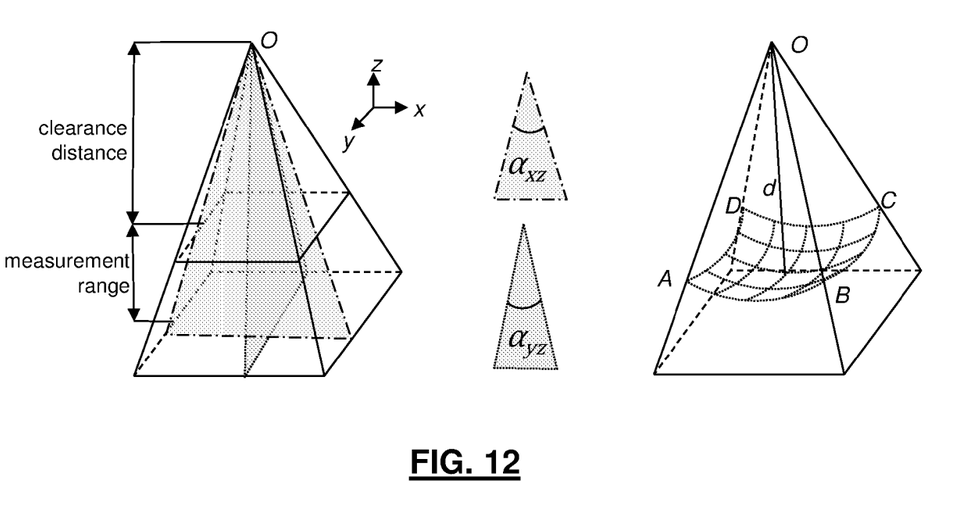
FIG. 12 shows a diagram illustrating a field of view (FOV) of a geometry sensor model, in accordance with embodiments of the present invention.

FIG. 12 shows a diagram illustrating a geometry sensor model, in accordance with embodiments of the present invention. Specifically, FIG. 12 shows a novel method of estimating the point density based on the model of the geometry sensor. Traditionally, point density around a point on the object can be estimated according to the position and normal. However, it is difficult to plan the sensing distance to achieve the desired point density based on the given formulae in. Thus, a novel estimation of the point density based on the model of the geometry sensor is provided. With reference to FIG. 12, the frustum of the geometry sensor is defined by:

a. $\alpha_{xy}$: the angular field of view on the xz-plane, b. $\alpha_{yz}$: the angular field of view on the yz-plane,
c. $\beta_x$: sampling number in the x-direction,
d. $\beta_y$: sample number in the z-direction,
e. Clearance distance, and
f. Measurement range.

The solid angle of the right rectangular pyramid is:

$$\eta = 4\arcsin\left(\sin\frac{\alpha_{xz}}{2}\sin\frac{\alpha_{yz}}{2}\right)$$

A sphere centering at O with radius d intersects the frustum at a spherical region, whose area is:

$$s = \eta d^2 = 4\arcsin\left(\sin\frac{\alpha_{xz}}{2}\sin\frac{\alpha_{yz}}{2}\right)\cdot d^2$$

Thus, the sampling density at distance d is estimated as $$\rho = \frac{\beta_x\beta_y}{s} = \frac{\beta_x\beta_y}{4\arcsin\left(\sin\frac{\alpha_{xz}}{2}\sin\frac{\alpha_{yz}}{2}\right)\cdot d^2}$$

As such, to achieve the sampling density $\Phi_k$, k=1, 2, the sensing distance should satisfy $$d \leq 2\sqrt{\frac{\arcsin\left(\sin\frac{\alpha_{xz}}{2}\sin\frac{\alpha_{yz}}{2}\right)}{\beta_x\beta_y\Phi_k}}.$$

The fully coverage is achieved by checking the status of each point on the global model. If all points are sensed by the sensors with the desired quality, the object is fully scanned.

Figure 13A:
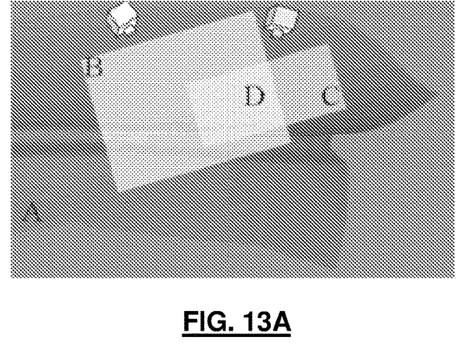
FIGS. 13A and 13B show ROIs and viewpoints identified using the method of FIG. 3, in accordance with embodiments of the present invention.

FIGS. 13A and 13B show a surface defect identified using the method of FIG. 3, in accordance with embodiments of the present invention. FIG. 13A shows an embodiment in which the capturing regions (i.e. field of vision) of the geometry sensor and the texture sensor are different. As such, points on the global model may have different status:
  Points that not scanned by both sensors (A in FIG. FIG. 13A)
  Points that scanned by texture sensor but not scanned by geometry sensor (B in FIG. 13A)
  Points that scanned by geometry sensor but not scanned by texture sensor (C in FIG. 13A)
  Points that scanned by both sensors (D in FIG. 13A)

The viewpoints are planned based on ROIs as discussed above to capture textures and geometries with the desired quality. After sensors are moved by the actuator planned viewpoints, data (i.e. images) are captured, and the captured data will be checked to see whether they meet the desired quality (for example, that the defect is identified by using at least five pixels). Thus, during the sensing/identification, the points identified in FIG. 13A can be further divided into the following groups:
  Points that not scanned by both sensors (A in FIG. 13B)
  Points that scanned by texture sensor but not scanned by geometry sensor
    Texture meets the desired quality (B1 in FIG. 13B)
    Texture does not meet the desired quality (B2 in FIG. 13B)
  Points that scanned by geometry sensor but not scanned by texture sensor
    Geometry meets the desired quality (C1 in FIG. 13B)
    Geometry does not meet the desired quality (C2 in FIG. 13B)
  Points that scanned by both sensors
    Both the texture and the geometry meet the desired quality (D1 in FIG. 13B)
    The texture meets the desired quality and geometry fails to meet the desired quality (D2 in FIG. 13B)
    Texture does not meets the desired quality and while the geometry meets the desired quality (D3 in FIG. 13B)
    Both the texture and the geometry fail to meet the desired quality (D4 in FIG. 13B)
    Both the texture and the geometry meet the desired quality (D1 in FIG. 13b)
    The texture meets the desired quality and geometry fails to meet the desired quality (D2 in FIG. 13b)
    Texture does not meets the desired quality and while the geometry meets the desired quality (D3 in FIG. 13b)
    Both the texture and the geometry fail to meet the desired quality (D4 in FIG. 13b)

Figure 13B:
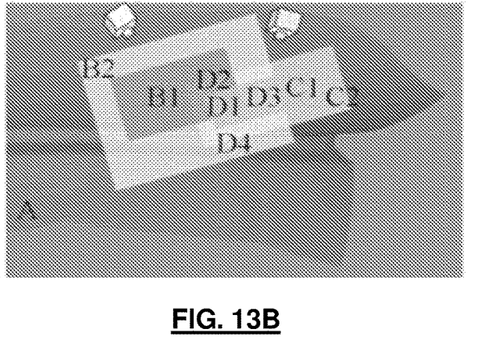

Group A is not empty before scanning (in other words, Group A is not a null group prior to scanning). The scanning may continue until group D1 is not empty, i.e. all points meet the desired quality, or attain the predetermined criteria. If the field of vision (FOV) of the texture sensor covers FOV of the geometry sensor, groups C, C1 and C2 in FIGS. 13A and 13B are always empty.

Figure 14:
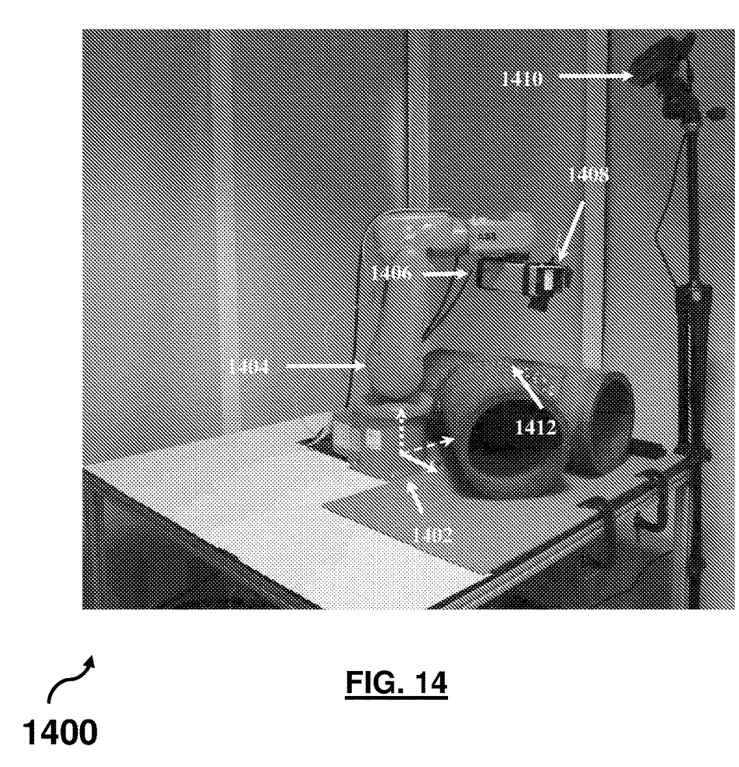
FIG. 14 shows an exemplary system for identifying dimensional and surface appearance defects on a joint pipe in accordance with embodiments of the present invention.

FIG. 14 shows an exemplary system 1400 for identifying a surface defect on a joint pipe 1412. A global sensor 1410 is used for global sensing. The global sensor 1410 may be a Microsoft Kinect-type camera. Geometry sensor 1406 and texture sensor 1408 are connected to the actuator 1404. All sensors are calibrated to the base coordinate system 1402 of the robotic arm (actuator) 1404. The inspection target 1412 is a Y-joint pipe 1412 placed on the desk. In this experiment, the pipe 1412 is inspected facing up.

Figure 15A:
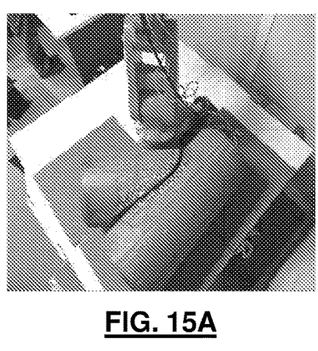
FIGS. 15A-15E show global coarse level sensing images of the joint pipe of FIG. 14.
Figure 15B:
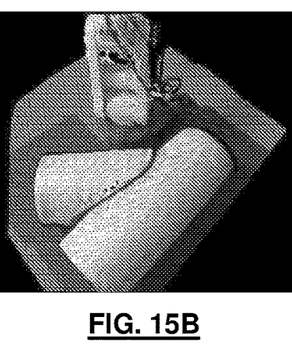
Figure 15C:
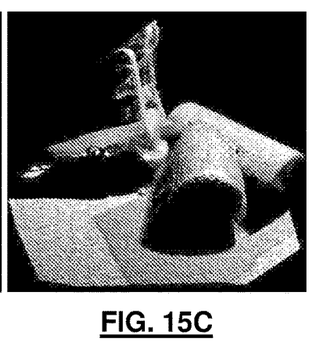
Figure 15D:
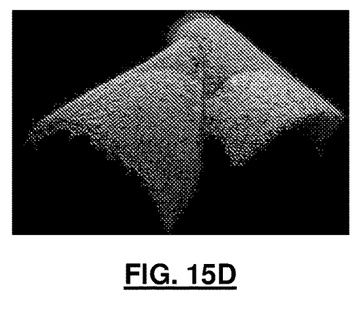
Figure 15E:
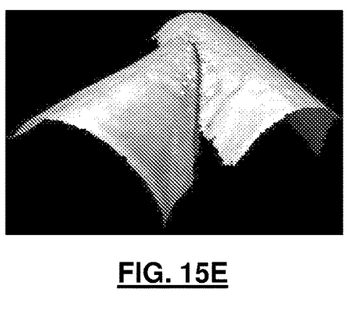

The global sensing results, both geometry and texture, are shown in FIGS. 15A to 15E. FIGS. 15B and 15C show the textured point cloud in two different views. After data processing, the global coarse level point cloud and surface can be derived and are shown in FIGS. 15D and 15E.

Figure 16:
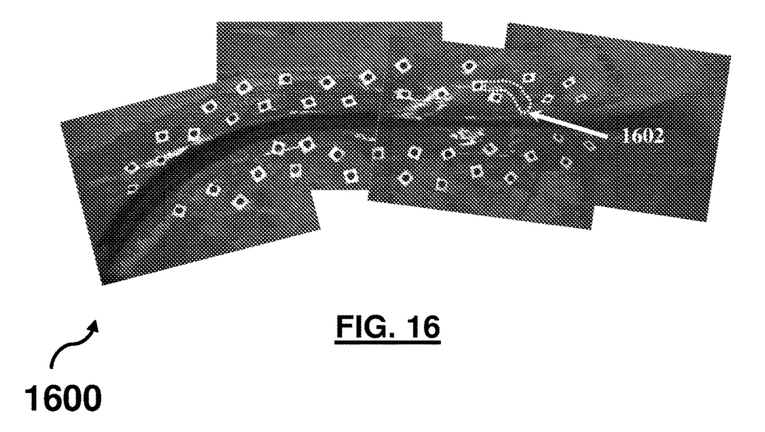
FIG. 16 shows a mosaic of four texture images from the texture sensor at four different viewpoints, in accordance with embodiments of the present invention.

FIG. 16 shows the texture images 1600 for the groove. In FIG. 16, the texture images 1600 are a mosaic of four texture images from the texture sensor at four different viewpoints. The system is trained to detect the groove region and the scratch on the pipe. During fine level sensing, there are four different viewpoints are used to cover the groove. The dotted area 1602 indicates a detected scratch. Thus, a new viewpoint 1800 (FIGS. 18A and 18B) is planned to capture the fine texture and geometry.

Figure 17A:
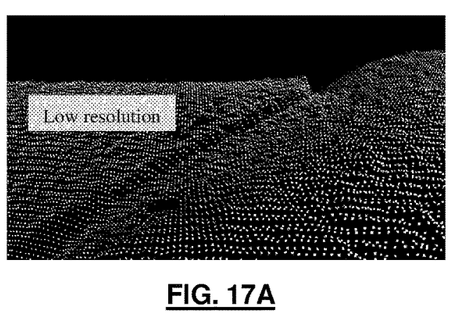
FIGS. 17A-17D show fine level sensing images of a groove on the joint pipe of FIG. 14.
Figure 17B:
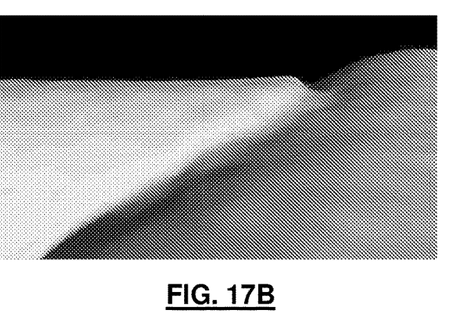
Figure 17C:
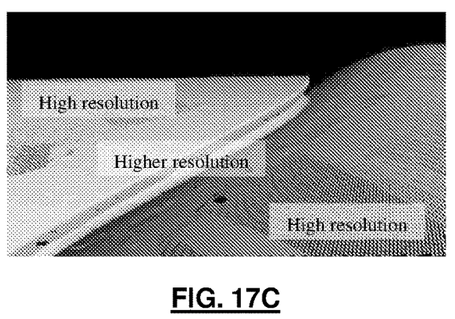
Figure 17D:
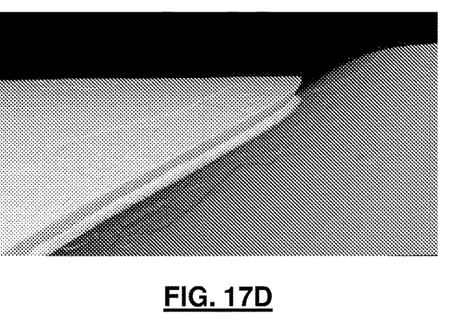

FIGS. 17A-17D show sensing images of a groove on the joint pipe of FIG. 14. FIGS. 17A and 17B show the coarse level geometry data compared with the fine level geometry data of FIGS. 17C and 17D. FIG. 17A shows point cloud data from the global sensing, while FIG. 17B shows coarse level geometry from the global sensing. FIG. 17C shows high resolution in non-groove region and higher resolution in groove region, and FIG. 17D shows fine level geometry after sensing.

Figure 18A:
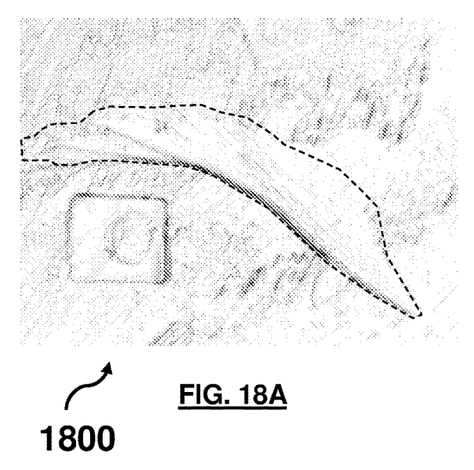
FIGS. 18A and 18B show fine level sensing images of a scratch on the joint pipe of FIG. 14.
Figure 18B:
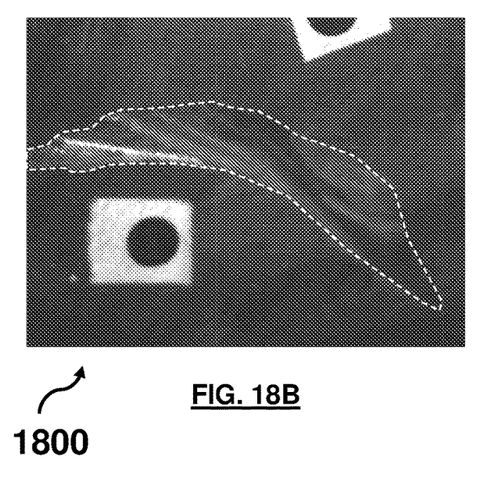

FIGS. 18A and 18B show fine level sensing images of the scratch on the joint pipe of FIG. 14. FIG. 18A shows fine level geometry of the scratch, which can be used for 3D measurement, while FIG. 18B shows a high resolution texture image of the scratch for analysis.

Thus it can be seen that the system and method for identifying a surface defect on an object presented in accordance with present embodiments have the advantages of optimal data acquisition and better inspection results. Moreover, embodiments of the present invention may have the following features and associated advantages:

Task-driven: the system is driven by both the surface inspection and dimensional inspection. Existing task-driven sensing derive sensing parameters according to the dimensional inspection requirements before the sensing. During the sensing, these parameters are fixed. The inspection tasks are not taken into account during the sensing. In our system, the inspection tasks are not used only for deciding the sensing parameters but also involves in during the sensing to improve the sensing quality. The sensing result contains a set of images for surface inspection and a 3D geometry for dimension inspection.

Joint texture and geometry analysis: different from previous sensor planning, which is mainly based on geometry analysis, the proposed framework plans the viewpoints based on both texture and geometry analysis.

Online adaptive sensing: different objects of the same type may have different surface defects in different part of the surface. Previous methods will plan a same set of viewpoints offline. The proposed method will identified the surface defects during the sensing and plane the viewpoint online to focus on the defect area, i.e. ROIs.

Adaptive resolution: For industrial applications, scanning efficiency is critical for throughput, while model quality should be enough for the inspection task. In previous solutions, both ROIs and non-ROIs are of a same resolution. The proposed solution scans the ROIs in a higher resolution and remains the non-ROIs in a lower resolution. As such, scanning efficiency is increased and model quality is guaranteed. The adaptive resolution should be achieved in both geometry and texture. Higher resolution in ROIs can help the defect detection and the defect measurement.

The present invention can be applicable in industries that require automatic visual inspection, including Application on robotic automation for defect inspection Assistant for inspector to achieve better inspection All data in a uniform coordinate system can be used for defect analysis Full coverage sensing with desired high quality in texture and geometry.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

What is claimed is:

1. A system for imaging a surface defect on an object, the system comprising:

an actuator;

a sensor assembly connected to the actuator, the sensor assembly comprising a plurality of sensors configured to capture a plurality of images of the object, the plurality of sensors comprising at least one geometry sensor configured to capture two-and-a-half-dimensional and/or three-dimensional images of the object and at least one texture sensor configured to capture two-dimensional images of the object; and a processor configured to control the actuator and the sensor assembly to:

identify a region of interest associated with the surface defect using an image of the object;

determine, using the two-and-a-half-dimensional and/or the three-dimensional images of the object, geometrical properties of the object;

determine, using the two-dimensional images of the object, texture properties of the object; and repeatedly identify at least one subsequent region of interest associated with the surface defect using at least a preceding region of interest such that the surface defect is identified according to a predetermined criterion, wherein the at least one subsequent region of interest is identified based on both the geometrical properties and the texture properties of the object.

2. The system of claim 1, wherein the predetermined criterion comprises a predetermined number of pixels per unit length.

3. The system of claim 1, wherein the plurality of sensors captures the plurality of images of non-regions of interest of the object in a first resolution while capturing the at least one subsequent region of interest associated with the surface defect in a second resolution, wherein the second resolution is higher than the first resolution.

4. The system of claim 1, wherein the sensor assembly further comprises at least one additional sensor, the at least one additional sensor comprising a global-view sensor configured to capture overall coarse geometry of the object, wherein the processor is configured to identify the region of interest using an image of the overall coarse geometry of the object captured by the global-view sensor.

5. The system of claim 1, wherein the predetermined criterion comprises a first predetermined sampling threshold and a second predetermined sampling threshold of the at least one geometry sensor, and wherein the at least one geometry sensor samples the at least one subsequent region of interest at a first sampling density larger than the first predetermined sampling threshold and samples the non-regions of interest at a second sampling density larger than the second predetermined sampling threshold, and wherein the first predetermined sampling threshold is greater than the second predetermined sampling threshold to support capture of three-dimensional images.

6. The system of claim 1, wherein the predetermined criterion comprises a predetermined accuracy threshold of the at least one geometry sensor, and wherein the at least one geometry sensor captures each point of the at least one subsequent region of interest at an accuracy larger than the predetermined accuracy threshold.

7. The system of claim 2, wherein the predetermined number of pixels per unit length is at least 5 pixels per millimeter.

8. A method of imaging a surface defect on an object, the method comprising:

capturing, using a sensor assembly connected to an actuator a plurality of images of the object, wherein the sensor assembly comprises at least one geometry sensor and at least one texture sensor, and wherein capturing the plurality of images of the object comprises capturing two-and-a-half-dimensional and/or three-dimensional images of the object using the geometry sensor and capturing two-dimensional images of the object using a texture sensor;

identifying, using a processor configured to control the actuator and the sensor assembly, a region of interest associated with the surface defect using an image of the object; and repeatedly identifying at least one subsequent region of interest associated with the surface defect using at least a preceding region of interest such that the surface defect is identified according to a predetermined criterion, wherein identifying the region of interest and the at least one subsequent region of interest comprises:

determining geometrical properties of the object using the two-and-a-half-dimensional and/or the three-dimensional images of the object and determining texture properties of the object using the two-dimensional images of the object; and identifying the region of interest and identifying the at least one subsequent region of interest in response to both the geometrical properties and the texture properties of the object.

9. The method of claim 8, wherein the predetermined criterion comprises a predetermined number of pixels per unit length.

10. The method of claim 8, wherein capturing the plurality of images of the object using the at least one sensor comprises capturing at least one image of a non-region of interest of the object in a first resolution while capturing the at least one subsequent region of interest associated with the surface defect in a second resolution, wherein the second resolution is higher than the first resolution.

11. The method of claim 8, wherein capturing the plurality of images of the object comprises capturing, using a global-view sensor, an overall coarse geometry of the object, and wherein identifying the region of interest associated with the surface defect comprises identifying the region of interest associated with the surface defect using an image of the overall coarse geometry of the object captured by the global-view sensor.

12. The method of claim 8, wherein the predetermined criterion comprises a first predetermined sampling threshold and a second predetermined sampling threshold of the at least one geometry sensor, and wherein capturing the plurality of images of the object comprises capturing three-dimensional images of the object using the geometry sensor by the at least one geometry sensor sampling the at least one subsequent region of interest at a first sampling density larger than the first predetermined sampling threshold and sampling the non-regions of interest at a second sampling density larger than the second predetermined sampling threshold, and wherein the first predetermined sampling threshold is greater than the second predetermined sampling threshold to support capture of the three-dimensional images of the object.

13. The method of claim 8, wherein the predetermined criterion comprises a predetermined accuracy threshold of the at least one geometry sensor, and wherein capturing the plurality of images of the object comprises the at least one texture sensor capturing each point of the at least one subsequent region of interest at an accuracy larger than the predetermined accuracy threshold.

14. The method of claim 9, wherein the predetermined number of pixels per unit length is at least 5 pixels per millimeter.

15. A non-transitory computer readable medium having stored thereon an application which when executed by a computer causes the computer to perform operations comprising:

capturing, using a sensor assembly connected to the actuator, at least a two-and-a-half-dimensional and/or three-dimensional image of the object using a geometry sensor and capturing a two-dimensional image of the object using a texture sensor;

identifying, using a processor configured to control the actuator and the sensor assembly, a region of interest associated with the surface defect using an image of the object; and repeatedly identifying at least one subsequent region of interest associated with the surface defect using at least a preceding region of interest such that the surface defect is identified according to a predetermined criterion, wherein identifying the region of interest and the at least one subsequent region of interest comprises:

determining geometrical properties of the object using the two-and-a-half-dimensional and/or the three-dimensional image of the object and determining texture properties of the object using the two-dimensional image of the object; and identifying the region of interest and identifying the at least one subsequent region of interest in response to both the geometrical properties and the texture properties of the object.

* * * * *